United States Patent
Yamada et al.

(10) Patent No.: US 7,124,283 B2
(45) Date of Patent: Oct. 17, 2006

(54) HARDWARE ACCELERATOR FOR A PLATFORM-INDEPENDENT CODE

(75) Inventors: Tetsuya Yamada, Kodaira (JP); Naohiko Irie, Kokubunji (JP); Takanobu Tsunoda, Kokubunji (JP); Takahiro Irita, Higashimurayama (JP); Keisuke Toyama, Yokohama (JP); Masayuki Kabasawa, Kokubunji (JP)

(73) Assignee: Renesas Technology Corp., Tokyo (JP)

( * ) Notice: Subject to any disclaimer, the term of this patent is extended or adjusted under 35 U.S.C. 154(b) by 445 days.

(21) Appl. No.: 10/457,409

(22) Filed: Jun. 10, 2003

(65) Prior Publication Data

US 2004/0003204 A1    Jan. 1, 2004

(30) Foreign Application Priority Data

Jun. 26, 2002    (JP)    ............................ P2002-185451

(51) Int. Cl.
*G06F 5/00*    (2006.01)
(52) U.S. Cl. ........................................ 712/209; 717/136
(58) Field of Classification Search ................ 712/209; 717/118, 136, 139, 146, 148
See application file for complete search history.

(56) References Cited

U.S. PATENT DOCUMENTS

| | | | |
|---|---|---|---|
| 6,775,763 B1 * | 8/2004 | Sexton et al. ................ | 712/227 |
| 6,820,252 B1 * | 11/2004 | Sakamoto et al. ........... | 717/136 |
| 6,826,749 B1 * | 11/2004 | Patel et al. .................. | 717/148 |
| 6,910,205 B1 * | 6/2005 | Bak et al. ..................... | 717/151 |
| 6,910,206 B1 * | 6/2005 | Nevill ........................ | 717/153 |

FOREIGN PATENT DOCUMENTS

EP    1313012 A1  *  5/2003

* cited by examiner

*Primary Examiner*—Eric Coleman
(74) *Attorney, Agent, or Firm*—Mattingly, Stanger, Malur & Brundidge, P.C.

(57) ABSTRACT

The present invention provides a hardware accelerator, which allows faster switching between processing modes. In an information processing device with a bytecode accelerator BCA for translating a stack-based intermediate code (bytecode) into register-based instructions, a selector SEL for switching between BCA and soft VM is posed between an instruction part FET and a decode part DEC and data transfer paths P4 and P5 are formed between BCA and the register file REG_FILE. When bytecode accelerator BCA is activated, the P3 side is selected by the selector SEL and the translated CPU instructions are transferred to the decode part DEC. If the intermediate language code cannot be translated by the BCA, the processing mode is switched to software processing. During switching between the modes, internal information of BCA can be transferred between BCA and REG_FILE in parallel, achieving faster mode switching.

12 Claims, 8 Drawing Sheets

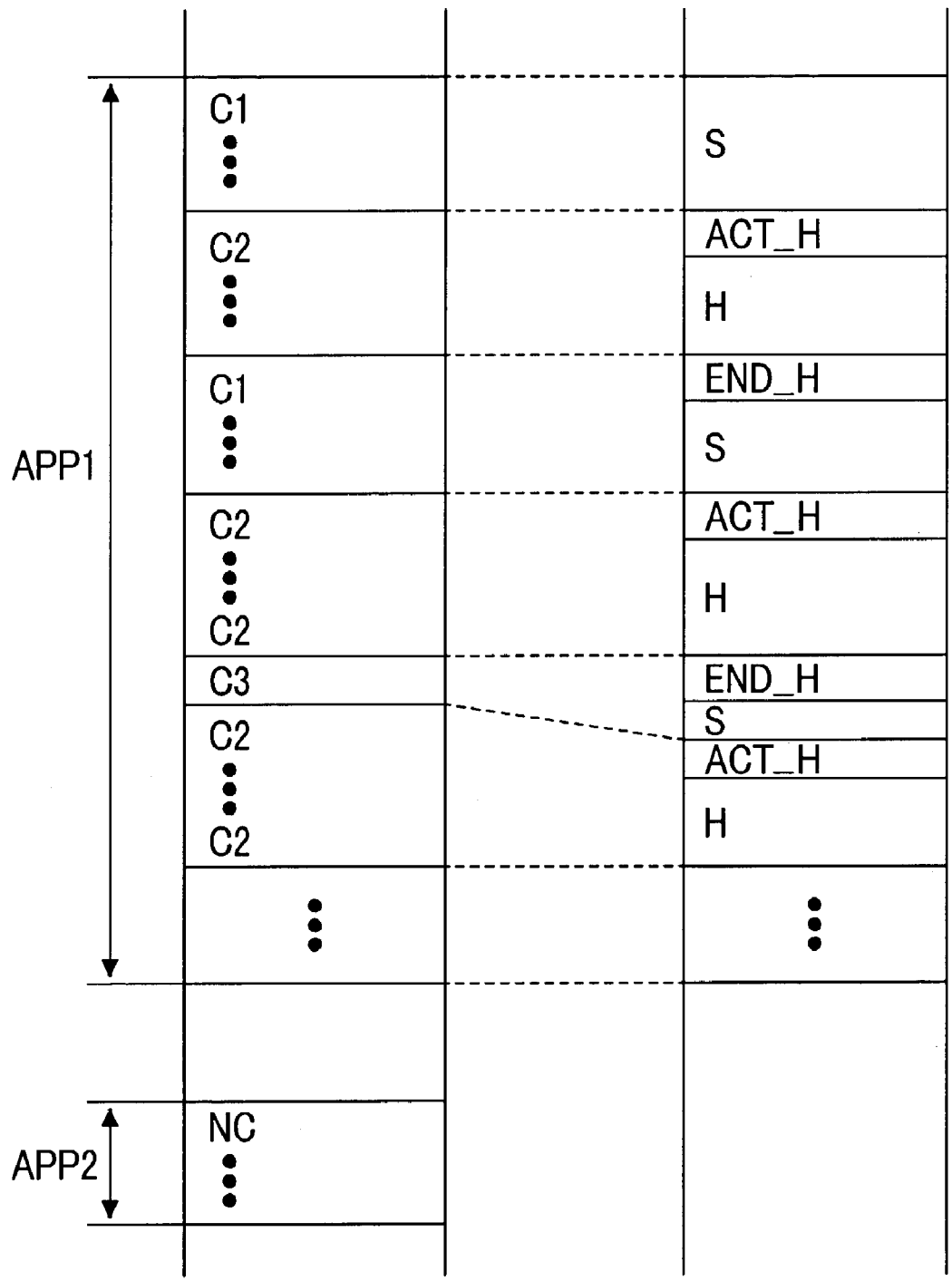

HARDWARE ACCELERATOR FOR A PLATFORM-INDEPENDENT CODE

BACKGROUND OF THE INVENTION

1. Field of the Invention

The present invention relates to a semiconductor integrated circuit used in a microprocessor and in particular, to an information processing device, which mounts a hardware accelerator for translating codes in a given intermediate language into instructions specific to each of microprocessor types.

2. Description of Related Art

Recently, applications written in the Java™ language have been increasingly used in cell phones and mobile computers. Java developed by Sun Microsystems is an object-oriented programming language analogous to C++. Note that "Java" is a registered trademark of Sun Microsystems. Java has been widely accepted for such a reason that Java programs are executed after being translated from the codes in the intermediate language into the instructions specific to each of microprocessor CPU types using a virtual machine. With the virtual machine mounted, any CPU has a high portability because Java applications can be executed whatever be the CPU type. Note that the intermediate language describes the codes, also called bytecodes, compiled for obtaining the executable Java object program.

As commonly known, since the virtual machine (hereafter, simply referred to as "VM"), which is generally provided by software (hereafter, simply referred to as "soft VM"), interprets and executes individual bytecodes using an interpreter, causing its processing speed to slow, an attempt to speed up processing is made by executing frequently used bytecodes on hardware in some cases. One of these cases is disclosed in PC 2000-507015 (WO 98/21655, PCT/U.S. 07/20980).

Prior to submission of the present application, the inventors of the present invention evaluated consistency between the result from translation of the intermediate language codes (bytecodes) by soft VM and that by hardware typically as in the Java language mentioned above. This means that if hardware is used in translating the bytecodes into instructions in the target language specific to the computer (hereafter, simply referred to as CPU instructions), it is ideal that all the bytecodes can be translated by hardware. Some bytecodes, however, have complex functions and when they are translated, a large amount of CPU codes may be generated ranging from several tens to several hundreds. For this reason, since it is difficult to execute all the bytecodes by hardware, only some of bytecodes are processed by it. This avoids scaling up of hardware involved in executing all the bytecodes by hardware only. Thus, it is required to switch between hardware processing and software processing as appropriate when bytecodes are translated.

FIGS. 9A and 9B show schematic views explaining how to switch between hardware processing and software processing according to the present invention. FIG. 9A shows application software APP1 (the bytecodes) and application software APP2 (the CPU codes), both of which are located on a memory map. Since APP2 is described by a CPU instruction NC, it can be directly executed with no need for translation.

On the contrary, before APP1 (the bytecode) can be executed, it must have been translated into its corresponding CPU instructions. The instructions used in APP1 may be grouped into the following three types from the standpoint of translation and execution. Specifically, C1 is an instruction in the first group of bytecodes and translated by soft VM. This means that C1 is the instruction not supported by a hardware translator. The next C2 is the instruction in the second group of bytecodes and translated by the hardware translator. The third C3 is the instruction in the third group of bytecodes and indicates an action to be taken when a Java run-time exception occurs during execution. The Java run-time exception occurs when the semantic constraint of the Java language is violated. For example, the exception, which occurs when an integer is divided by a divisor 0 (zero), is defined as Arithmetic Exception. When the Java run-time exception is detected, the control is transferred to soft VM and the exception is processed by an error handling routine integrated in soft VM. Since neglecting C3 may induce runaway of the microcomputer itself, any correct error handling action must always be taken.

FIG. 9B shows execution status of a group of C1 to C3 instructions. S indicates the process executed by soft VM while H indicates that by hardware. At this point, to switch from S to H, a hardware start-up process ACT_H must be added and to switch from H to S, a hardware end and soft VM start-up process END_H must be added. The inventors are aware that if switching between S and H are frequently performed using enable and disable instructions for enabling and disabling execution by hardware or if the Java exception occurs during execution by hardware, ACT_H or END_H might occur, causing the processing speed to slow.

SUMMARY OF THE INVENTION

One of objects of the present invention is to speed up switching between hardware processing and software processing.

Now, the summary of typical aspects of the present invention disclosed in the present application is described below in brief. The present invention can be characterized in that it comprises plural registers, an execution part for executing the first format instructions as CPU instructions, and an instruction translator logic, and provides two operation modes, the first operation mode in which the information processing device executes the first instruction group in the first program after translating it into the first format instructions using the instruction translator logic when the first program in the second format is executed and the second mode in which the device executes the second instruction group in the first program after translating it into the first format instructions using translation software described by the first format instructions, wherein the switching operation between the first and second operation modes is performed in parallel with the data transfer operation between at least one of the plurality of registers and the instruction translator logic.

Alternately, according to another aspect of the present invention, the information processing device may provide a data transfer path for transferring data between the instruction translator logic and a register file.

BRIEF DESCRIPTION OF DRAWINGS

FIG. 9 is a view showing the comparison of bytecode processing between soft VM and the bytecode accelerator.

DETAILED DESCRIPTION OF THE PREFERRED EMBODIMENTS

Now, referring to the accompanying drawings, embodiments suitable for the data processing device of the present invention are described below. Logic elements making up each of blocks in the individual embodiments are mounted on, but not limited to, a single semiconductor substrate, for example, a monocrystalline silicon substrate by any of the techniques for manufacturing semiconductor integrated circuits such as a known CMOS (Complementary MOS transistor) and bipolar transistor.

Figure 1:
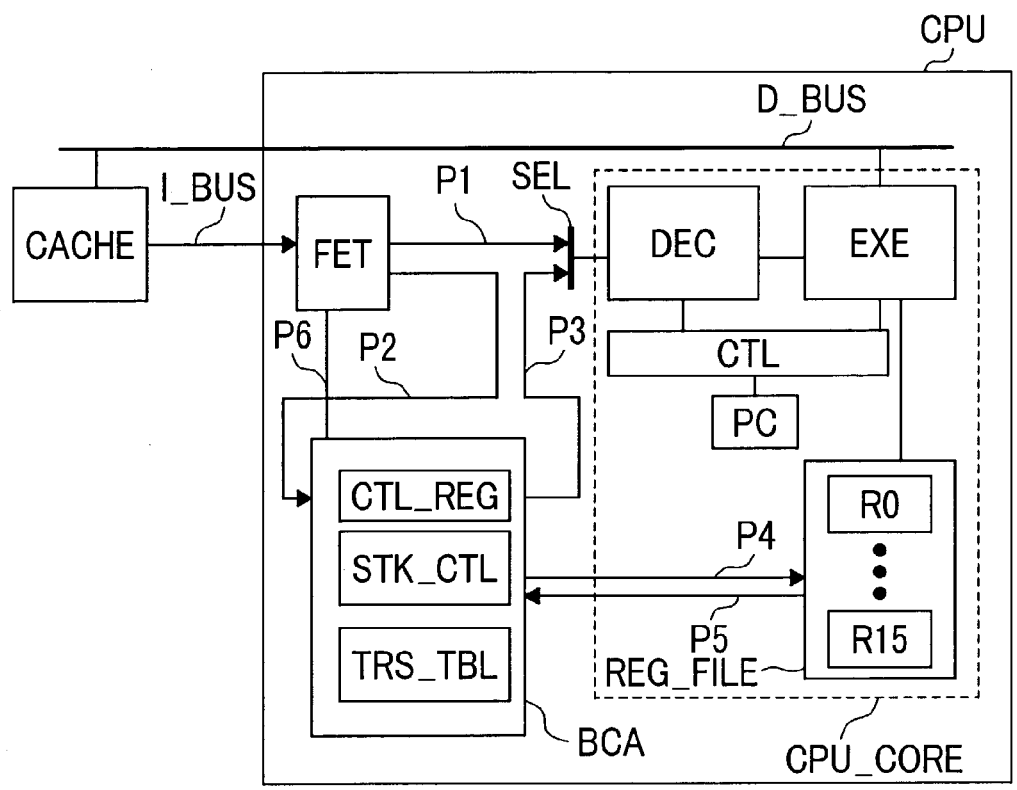
FIG. 1 is a view showing the system configuration according to the embodiment of the present invention.

First, referring to FIG. 1, the configuration of a bytecode accelerator according to an embodiment of the present invention is shown. A CPU is connected to a CACHE via an instruction bus I_BUS and a data bus D_BUS. The CPU is made up of an instruction fetch part FET for supplying instructions (generally referred to as an instruction input), a bytecode accelerator BCA (generally referred to as an instruction translator logic) for translating the bytecode in the intermediate language into its corresponding CPU instructions, a selector SEL for selecting the CPU instructions at the outputs of the instruction fetch part and the bytecode accelerator, a decode part DEC for decoding instructions, an instruction execution part EXE for performing arithmetic operation and execution of instructions, a control part CTL for generating control signals, a program counter PC, a register file REG_FILE, and data transfer paths P4 and P5 for transferring data between the register file and the bytecode accelerator BCA. According to this embodiment, the register file includes, but not limited to, 16 general registers with names ranging from R0 to R15 assigned.

As mentioned in connection with FIGS. 9A and 9B, to execute APP2 described by CPU instructions, the selector SEL always selects the path P1 with BCA disabled. On the contrary, to execute APP1 described by bytecodes mentioned in connection with FIGS. 9A and 9B, SEL selects one of P1 and P3 for transferring data to DEC. When the bytecodes are executed using soft VM, the selector selects P1. On the other hand, when BCA is selected, data is transferred to DEC via P2 and then P3.

The bytecode accelerator BCA is made up of a translation table part TRS_TBL, a stack control part STK_CTL, and a control register CTL_REG. In the translation table part TRS_TBL, stack-based bytecodes are translated into their corresponding plural register-based CPU instructions. This part contains table-format CPU instructions corresponding to all the bytecodes supporting execution by hardware and manages count information, which indicates the order of each of the translated CPU instructions.

Count information is generated by a state machine in the translation table part. The count information can be used to make reference to the table, allowing the bytecode to be translated into its corresponding plural CPU instructions.

The bytecode has a variable length ranging from one byte to several bytes. The translation table part recognizes the bytecode length of each bytecode, translates the bytecode into its corresponding CPU instructions, notifies the instruction fetch part of the bytecode length used via P6, and receives the next bytecode via P2.

The following describes the reason why the system of the present invention can translate the bytecodes faster than soft VM. When soft VM is used, an instruction processing loop is necessary for interpreting the bytecodes one by one at an interpreter for execution. Since the soft VM contains a table used in translating the bytecodes into corresponding CPU instructions, a branch-to-table operation must be executed to make reference to the table in executing the bytecodes in the loop. As mentioned above, in the case of soft VM, overheads needed for the instruction processing loop operation in the interpreter part and the branch-to-table operation are incurred, while in the case of the system of the present invention, they are not incurred, achieving faster processing.

The stack control part STK_CTL controls current status of assignment of upper seven stacks to, but not limited to, seven registers out of the general registers R0–R7 in the CPU register file and manages stack information concerning the top and bottom of the stack. This means that any Java bytecode assumes that stacks are used. On the contrary, the CPU of the present invention is a so-called register-based architecture and does not achieve high consistency between the results translated by hardware and soft VM with no measure taken. If the stacks are made on main memory, they can be processed by the assigned registers at sacrifice of slow down of access speed. To avoid this problem, the upper part of the operand stacks can be assigned to the some of the general registers (for example, R0–R7) to translate stack-based bytecodes into their corresponding register-based CPU instructions efficiently. Another advantage of assigning the operand stacks to the registers is in that the number of load/store instructions is less than that of the stack-based machine because the results from the previous instructions in the registers can reused used for the next instructions.

The stack control part manages stack information indicating current status of the operand stacks assigned to the general registers, which varies with individual CPU instructions.

Finally, the control register part CTL_REG contains an enable bit for enabling the bytecode accelerator. To enable the bytecode accelerator, first, the enable bit of the control register is set. Then, the bytecode accelerator activates when detecting a specific CPU instruction and initiates bytecode translation.

The following describes the operational principle which is one of features of the embodiments of the present invention. The bytecode accelerator BCA, when activating, must set (1) the address (JavaPC) of the Java instruction (bytecode) in the program counter PC of the CPU and (2) internal information made of stack information stored in the general register (for example, R10) of the CPU and count information from the translation table part in REG_CTL of the bytecode accelerator. In the program counter PC, the address of the Java instruction stored in the general register is set from one (for example, R11) of the general registers in the register file via the execution part EXE and the control part CTL. At the same time, internal information made of stack information stored in one (for example, R10) of the general registers in the register file REG_FILE and count information from the translation table part is set in the register control part REG_CTL of the bytecode accelerator BCA via a data transfer path 4 in parallel with the operation mentioned above.

In addition, to end its processing, the bytecode accelerator must (1) set the CPU instruction address of soft VM in the program counter of the CPU, (2) extract internal information from the bytecode accelerator in the general register of the CPU, and (3) extract the Java code address (JavaPC) from the CPU program counter in the general register. To set the CPU instruction address of soft VM in the CPU program counter, the bytecode is translated by BCA into its corresponding branch instruction and then output, the instruction is selected by the selector, and set the address of the instruction program counter via the decode part and the control part. At the same time, the address from the program counter JavaPC is set in one (for example, R11) of the general registers in the register file REG_FILE via the CTL part and the EXE part, and internal information from BCA is set in one (for example, R10) of the general registers in the register file REG_FILE via the data transfer path P5 in parallel with the operation mentioned above.

As known from the descriptions above, the advantage of the present invention is in that the data transfer paths P4 and P5 are employed. This allows internal information of the bytecode to be transferred easily between the bytecode accelerator BCA and the register file REG_FILE, which in turn, achieves address setting in the program counter in parallel with transfer internal information of the bytecode.

Figure 2:
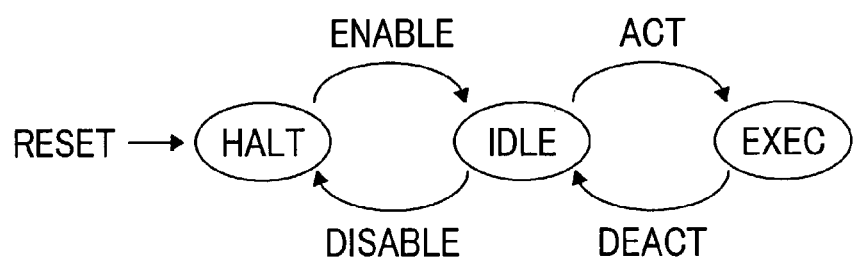
FIG. 2 is a view showing state transition in the device according to the embodiment of the present invention.

FIG. 2 shows status transition in the bytecode accelerator BCA. BCA provides three operation modes, HALT, IDLE, and EXEC. BCA, when being reset, always goes to the HALT state (RESET). In the HALT state, BCA is disabled and cannot activate.

To translate the bytecode, the enable bit of the control register is set to 1 (one) for placing BCA in the IDLE state (ENABLE) In the IDLE state, BCA is enabled and can detect the activate instruction for BCA. In the IDLE state, soft VM described by the CPU instructions, or software made of CPU instructions is running.

When the BCA activate sequence is executed, BCA goes to the EXEC state (ACT). In the EXEC state, BCA executes the bytecodes on hardware.

On the other hand, when the BCA end sequence is executed, BCA goes to the IDLE state (DEACT). This end sequence should be necessary when processing hardwear-unsupported bytecode using soft VM, processing the Java exception handling in case of a Java exception during execution, for example, NullpointerException, and processing the CPU exception handling heeded for correcting erroneous TLB and the interrupt occur.

Figure 3:
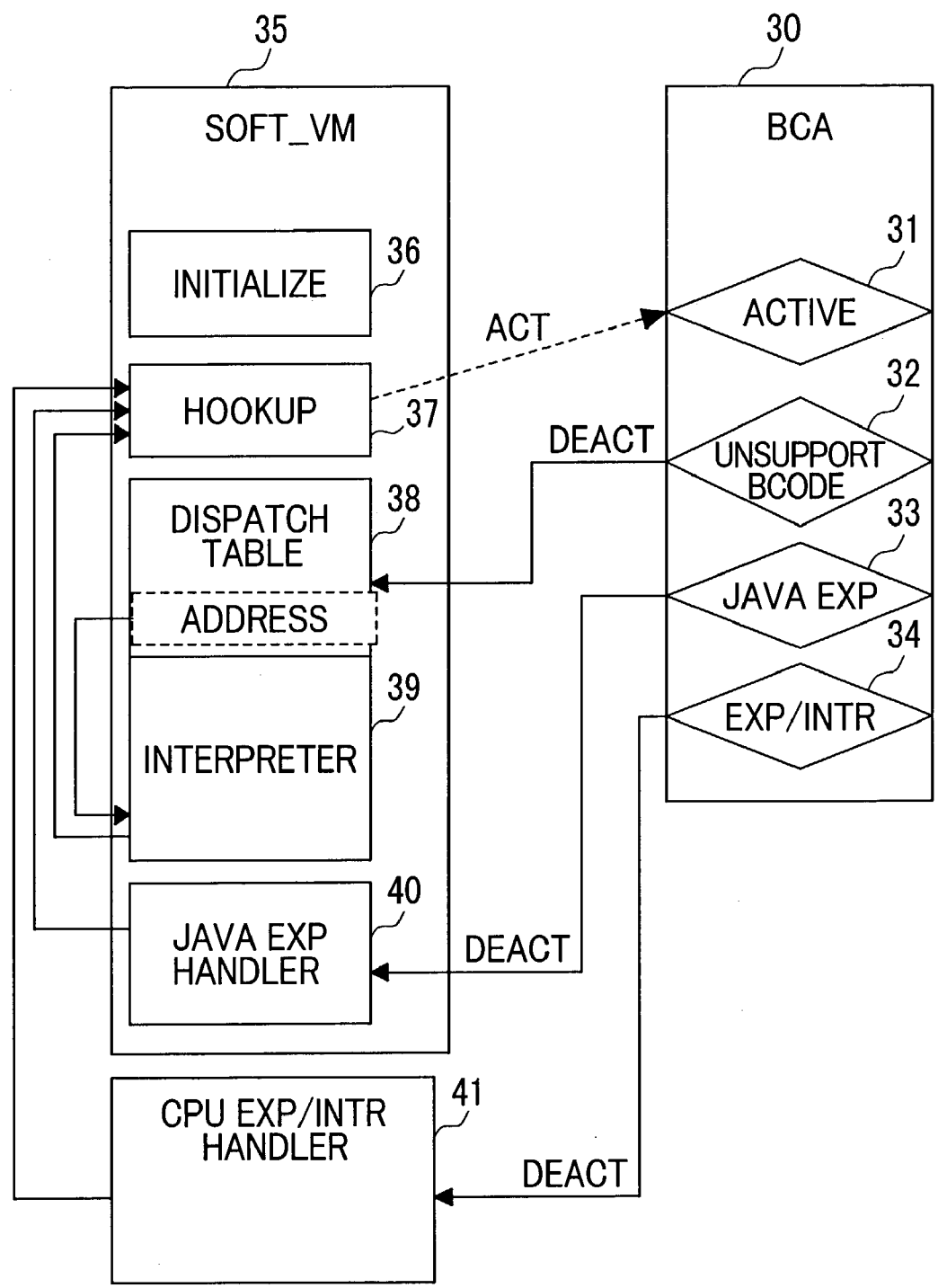
FIG. 3 is a view showing the flow chart of soft VM according to the embodiment of the present invention.

The bytecode accelerator BCA executes the bytecodes on hardware and makes up a virtual machine in corporation with the other installed software. This software is called soft VM. FIG. 3 shows assignment of operations and transition between BCA and soft VM according to the embodiment of the present invention.

Soft VM, SOFT_VM, is made up of an initialization part (INITIALIZE) 36 for initializing soft VM execution, a hook up part (HOOKUP) 37 for containing the activate instruction, which activates the bytecode accelerator, a dispatch table (DISPATCH TABLE) 38 indicating a starting address of the bytecode to be interpreted and executed by software, an interpreter part (INTERPRETER) 39 for containing corresponding CPU instructions pointed by the addresses in the dispatch table, which are interpreted and executed by software, and a Java exception handler (JAVA EXP HANDLER) 40 for executing an appropriate exception handling process in case of a Java exception.

When an unsupported bytecode 32 is detected, the starting address of the corresponding bytecode in the dispatch table 38 is passed to the interpreter 39 and based on the address information, the interpreter 39 interprets and executes the bytecode. The dispatch table contains 256 arrays of 8-bit bytecodes.

Any an exception event 33 defined in Java specifications, when detected in BCA during Java execution, is handled in a Java exception handler 40 of soft VM. The bytecode accelerator BCA assigns identifications to the individual Java exceptions.

In case of a CPU exception or interrupt (EXP/INTR) 34, a CPU exception/interrupt handler other than soft VM handles it correctly.

HOOKUP 37 is a software routine, which contains the activate instruction to be executed by software when the bytecode accelerator BCA is activated. After an unsupported bytecode is executed in the interpreter, the Java exception handler or the CPU exception/interrupt handler branches to HOOKUP 37 and then activates BCA. In this case, HOOKUP 37 may reside either in one point or in several points. For example, the process for executing the unsupported bytecode may be included in the interpreter part of soft VM and the activate instruction may be inserted at the end of each of the processes for executing the bytecodes.

Figure 4:
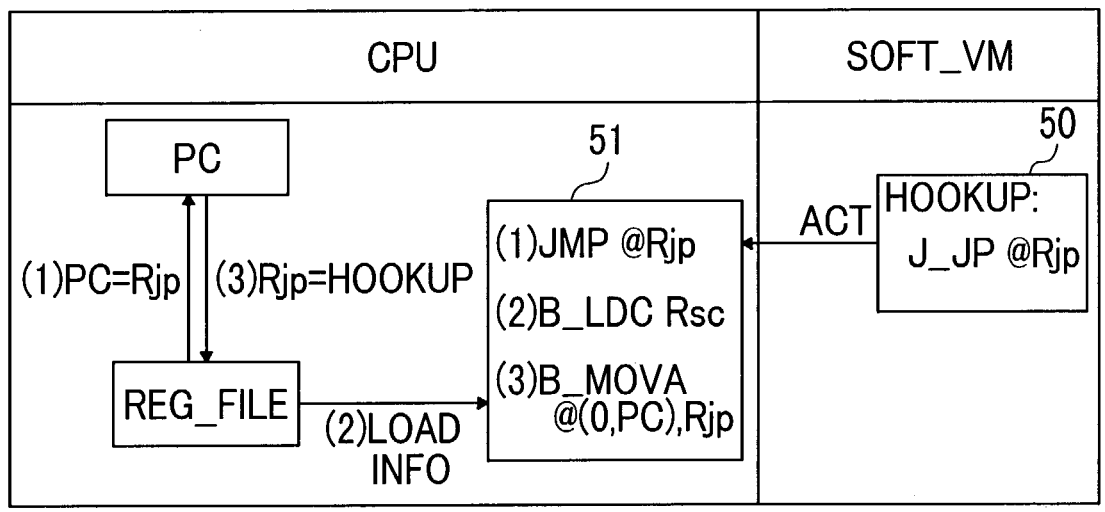
FIG. 4 is a view showing an activate sequence according to the embodiment of the present invention.

In FIG. 4, the activate sequence according to the embodiment of the present invention is shown. BCA in the IDLE state, when detecting a corresponding CPU instruction (J_JP) issued as the activate instruction, goes to the EXEC state. More specifically, the interpreter (39 in FIG. 3) of soft VM, while soft VM is translating and executing a series of bytecodes, branches to the HOOKUP routine every time one bytecode is executed. The HOOKUP routine contains the activate instruction. BCA in the IDLE state, when the CPU fetches the activate instruction J_JP, detects is as the activate instruction and provides the following three instructions to the CPU as the activate sequence. The CPU, when receiving the sequence, cancels the execution of J_JP and initiates execution of the following three instructions:

(1) JMP @Rjp
(2) B_LDC Rsc
(3) B_MOVA @(0, PC), Rjp (1) The first JMP @Rjp instruction sets the program counter PC of the CPU as the bytecode address (JavaPC) to be processed in BCA. In the case of soft VM, JavaPC is contained in Rjp, it is sufficient to simply transfer it to the PC. According to the embodiment of the present invention, Rjp is, but not limited to, the general register R11. The bytecode accelerator BCA starts execution of the bytecodes from the address pointed by the PC. Prior to setting the program counter, BCA executes the following two instructions in (2) and (3) in parallel with the branch instruction.

(2) The B_LDC Rsc instruction sets an internal state of the bytecode accelerator from the general register Rsc in the bytecode accelerator. Internal information is made of instruction counter information and register stack information. According to the embodiment of the present invention, Rsc is, but not limited to, the general register R10. By restoring internal information in the general register, the internal state of the bytecode accelerator immediately before a CPU exception/interrupt occurs can be recovered. At this time, it is required that Rsc be not changed in the CPU exception handler.

(3) The B_MOVA @(0, PC), Rjp instruction stores the program counter value when the J_JP instruction is issued. This value indicating the HOOKUP address is stored in Rjp as the address of the bytecode accelerator activate instruction and used as the return address in case of a CPU exception/interrupt. After the CPU exception/interrupt is handled, control is branched to HOOKUP and BCA is reactivated.

Figure 5:
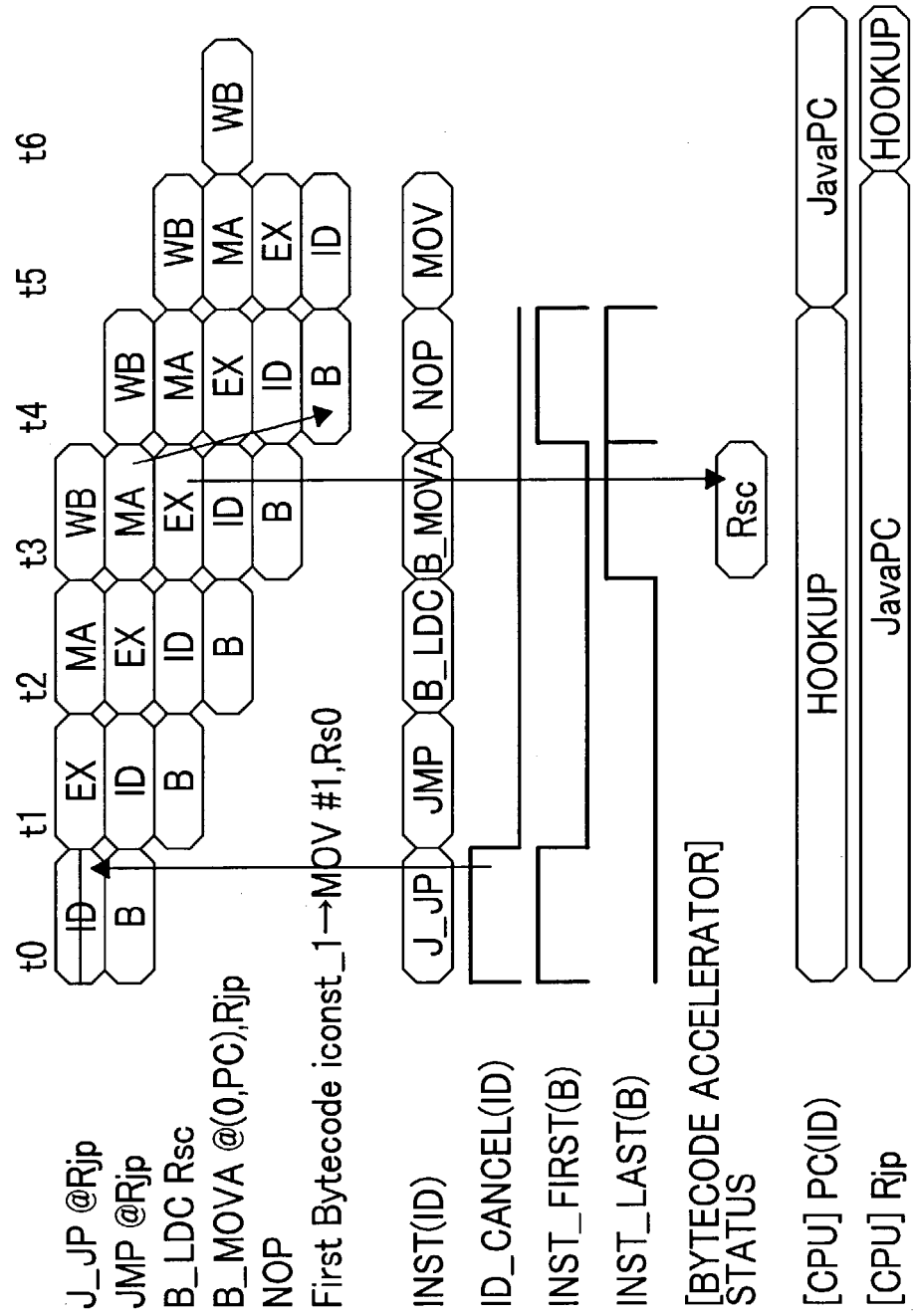
FIG. 5 is a view showing the time chart of the activate sequence according to the present invention.

FIG. 5 shows one example of time charts for the activate sequence according to the embodiment of the present invention. Assuming that six levels of pipelines are provided, the CPU according to the embodiment is made of an instruction fetch IF, a bytecode translation B, a decode ID, an execution EX, a memory access MA, and a register write WB.

The bytecode accelerator BCA detects the CPU instruction J_JP at the ID stage, asserts the ID_CANCEL signal to the CPU notifying of cancellation of the ID stage, and initiates transfer of the activate sequence at the B stage, all of which are performed at the time t0. The CPU cancels the J_JP instruction at the time t0.

BCA asserts the INST_FIRST signal indicating the top of the sequence to the CPU. The CPU sends the INST_FIRST signal so that the interrupt may be accepted at the boundary between bytecodes.

The activate sequence is made of an instruction group ranging from JMP @Rjp to NOP. BCA asserts INS_LAST signal to the CPU indicating that the NOP instruction is the last one in the sequence at the time t3. The CPU uses the INST_LAST signal in updating the program counter and as the end signal for the branch-delay slot.

The target of the branch instruction JMP @Rjp is the first bytecode iconst_1 to be processed in BCA at the time t4. At this time, three instructions, B_LDC, B_MOVA, and NOP inserted between the JMP instruction and iconst_1 can be executed in parallel with the JMP instruction and regarded as a branch-delay slot. The CPU can recognize the range of the branch-delay slot based on the INST_LAST signal. In general, if plural branch-delay slot instructions are inserted, no distinction can be made among them because the branch instruction is the return address when the exception occurs at the branch-delay slot, although three instructions mentioned above involve no problem because no CPU exception occurs. With respect to interrupts, the detecting instruction is the top of the sequence only by using the INST-FIRST signal, preventing any problem from occurring. Thus, the JMP instruction of the activate sequence can be considered to have three delayed branch instructions.

The B_LDC Rsc instruction transfers the general register Rsc to the bytecode accelerator BCA at the time t3. BCA sets the internal state machine based on internal information made of stack information and count information from the translation table part at the time t3 before the first bytecode is translated at the time t4.

The B_MOVA @(0, PC), Rjp instruction transfers the address HOOKUP for the J_JP instruction to Rjp at the time t6. At the time t4, execution of the first bytecode is initiated on hardware.

As mentioned above, since the process necessary for activating the bytecode accelerator BCA is executed using the branch-delay instructions, the overhead required to activate the bytecode accelerator is reduced. A novel invention in the device configuration, which allows the instructions to be executed using this type of branch-delay slots, is a set of data transfer paths P4 and P5 between BCA and the register file. This delay slot may include other instructions. For example, local variable or stack top transfer instruction from memory to the general registers can be placed.

Figure 6:
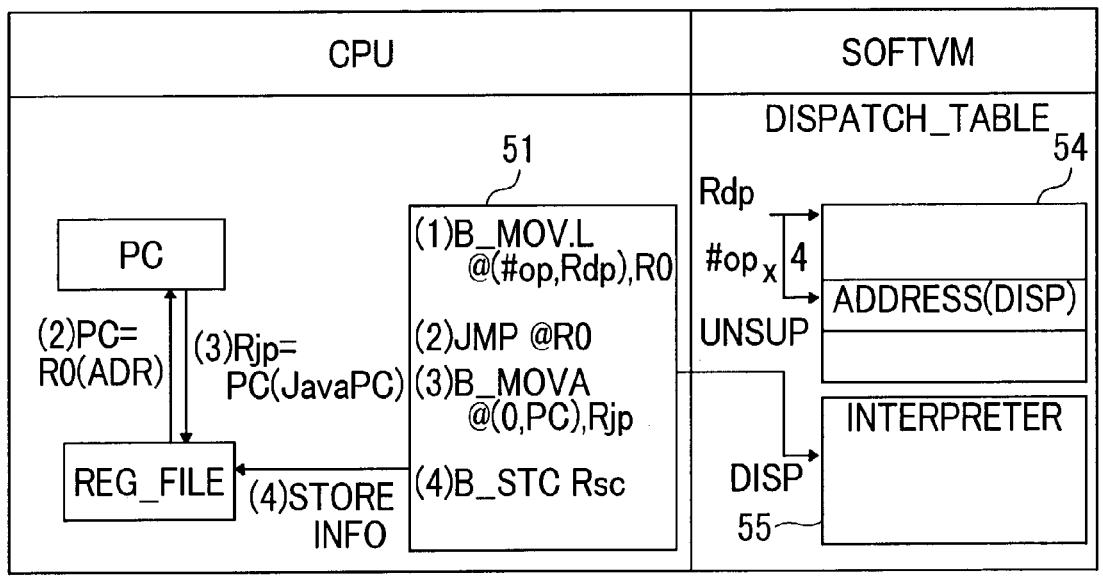
FIG. 6 is a view showing an end sequence according to the embodiment of the present invention.

FIG. 6 shows the end sequence of the BCA unsupported bytecode as one example of the end sequences according to the embodiment of the present invention. When BCA determines the bytecode cannot be executed on hardware, BCA goes to the IDLE state from the EXEC state and control is transferred to soft VM in order to use the interpreter of soft VM as the unsupported bytecode. If any data exist on the operand stack of the register, first, it is stored in memory. Here, the sequence of storing in memory is not shown. The sequence is made of the following four instructions:

(1) B_MOV.L @(#op, Rdp), R0
(2) JMP @R0
(3) B_MOVA @(0, PC), Rjp
(4) B_STC Rsc (1) First, the B_MOV.L @(#op, Rdp), R0 instruction loads the corresponding bytecode processing address obtained from the sum of the bytecode index #op and the base address Rdp from the dispatch table into the general register R0.

(2) Next, the JMP @R0 instruction branches to the address indicated in R0 and the target is the interpreter of the unsupported bytecode in the soft VM. The following two instructions are executed in parallel with this branch instruction.

(3) Third, the B_MOVA @(0, PC), Rjp instruction sets the JavaPC of the unsupported bytecode in the register Rjp. According to the embodiment of the present invention, Rjp is the general register R11.

(4) Finally, the B_STC Rsc instruction sets internal information made of stack information of the bytecode accelerator and count information of the translation table in the general register Rsc. According to the embodiment of the present invention, Rsc is the general register R10. Parallel processing of the branch instruction and register data transfer improves the end processing speed. When the JMP @R0 instruction branches to soft VM, the bytecode accelerator BCA goes to the IDLE state.

The unsupported bytecodes, which are not executed by BCA on hardware, have been described as one example of end sequence. Similarly, in case of a Java exception, the branch operation to the Java exception handler can be executed in parallel with such operations that the Java exception ID code is assigned, JavaPC is set in Rjp, and internal information of the bytecode accelerator is set in the general register Rsc, achieving faster end processing. The Java ID code is that BCA sets of the type of the occurred Java exception in the general register for notifying soft VM. For example, NullPointerException is 0. According to the embodiment of the present invention, the general register is, but not limited to, R0.

In the CPU exception/interrupt process, internal information of the bytecode accelerator is set in the general register Rsc and the return address HOOKUP from the CPU exception/interrupt handler is set in the program counter, and JavaPC is set in the Rjp, and then BCA goes to the IDLE state. Then, CPU executes the normal CPU exception/interrupt handler.

Figure 7:
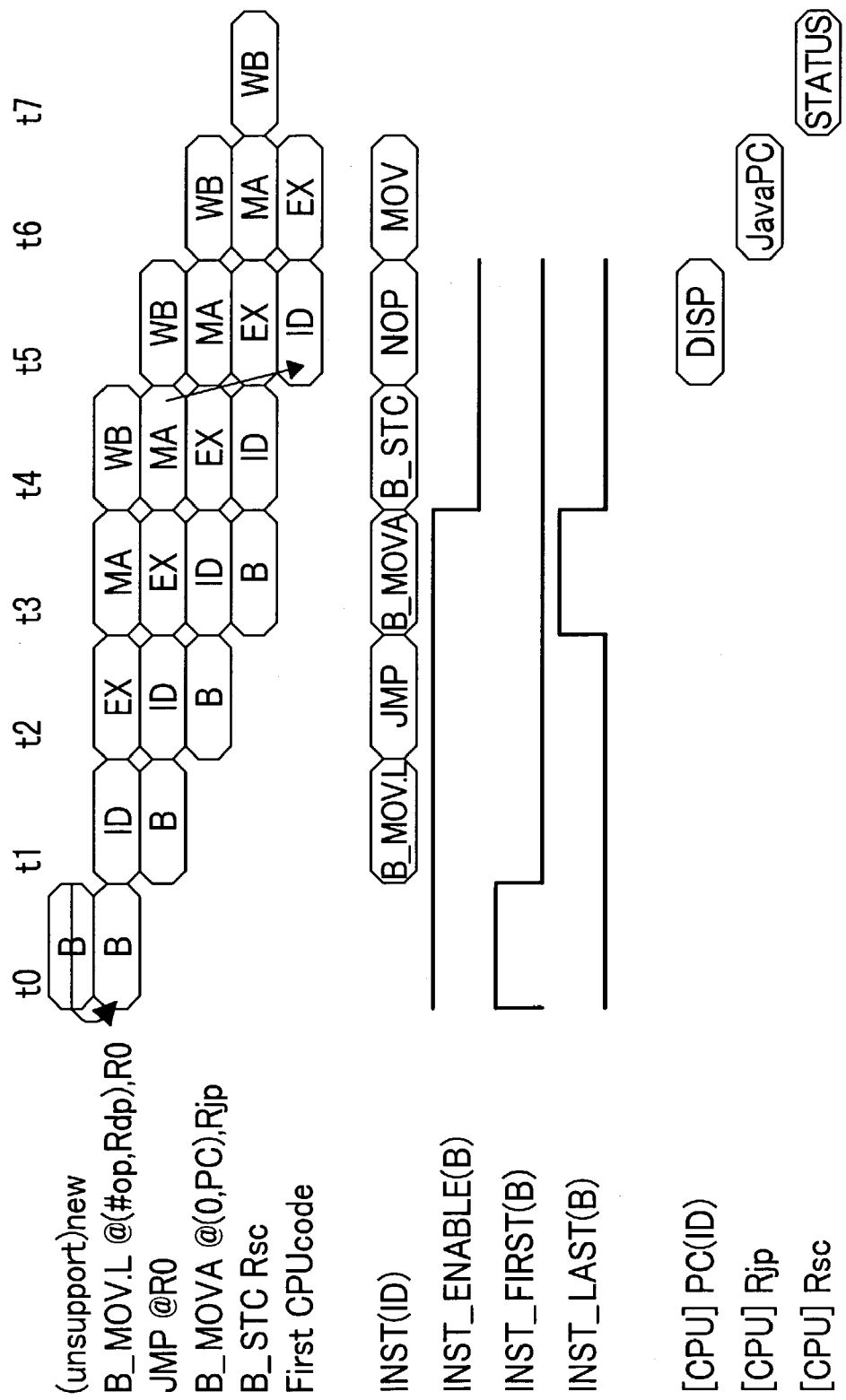
FIG. 7 is a view showing the time chart of the end sequence according to the embodiment of the present invention.

FIG. 7 shows one example of time charts for the end sequence according to the embodiment of the present invention. When BCA detects an unsupported bytecode "new" which cannot be executed on hardware, it supplies an end sequence, then transits to the IDLE state. After the CPU executes the instructions in the end sequence, control is transferred to soft VM. If valid data of operand stack is present on general registers, the data in the registers is saved in memory. The figure shows the sequence that no valid data of operand stack is on the register and no data need be saved on memory.

BCA initiates sending the end sequence at the B stage at the same time t0 when detecting the unsupported bytecode "new" at the same stage. Similar to the activate sequence according to the embodiment of the present invention, BCA asserts the INST_FIRST signal indicating the top of the sequence to the CPU. The end sequence is made of the instructions ranging from B_MOV.L to B_STC. The B_STC instruction is the last one of the sequence, BCA asserts the INST_LAST signal indicating the end of the sequence to the CPU at the time t3. At the same time t3, BCA negates the INST_ENABLE signal indicating that BCA is in the IDLE state to the CPU. When the INST_ENABLE signal is negated, the selector SEL selects the CPU instruction on the P1 side and not on the BCA side.

The target of the branch instruction JMP @R0, the first CPU instruction in soft VM, is decoded at the time t5. At that time, two instructions B_MOVA and B_STC can be executed in parallel with the JMP instruction and regarded as the branch-delay slot similar to the activate sequence. The range of the branch-delay slot can be recognized by the INST_LAST.

At the time t5, the address of the dispatch table (DISP) for the corresponding bytecode is set in the program counter PC and execution of the CPU instruction is initiated by soft VM.

The CPU, when receiving the B_MOVA @(0 PC), Rjp instruction, writes JavaPC of the program counter into the general register Rjp at the time t6. The CPU, when receiving the B_STC Rsc instruction, writes status of internal information of the bytecode accelerator into the general register Rsc at the time t7.

Figure 8:
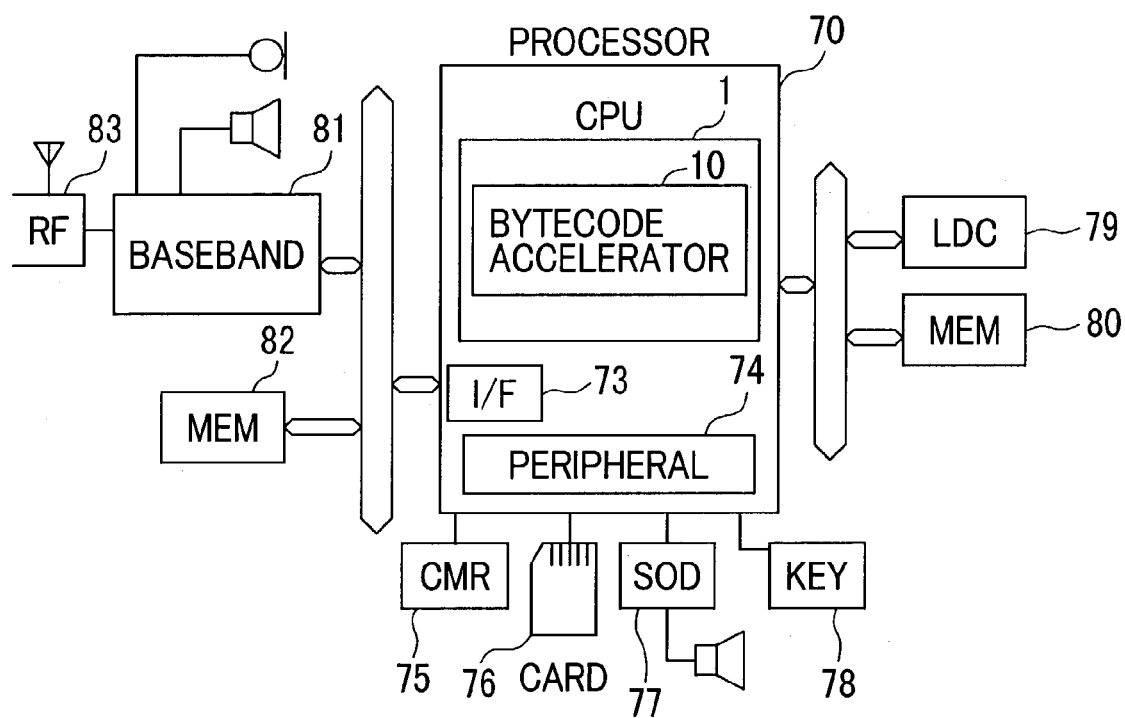
FIG. 8 is a view showing the system configuration according to the embodiment of present invention.

FIG. 8 is a schematic view showing the configuration of the mobile information system as an example of suitable application More specifically, it is an example of cell phone configuration. The configuration is largely composed of a communication component and an application component. The communication component is made of an antenna (RF) part 83 for sending/receiving radio waves, a baseband modem and a base band processor for performing codec (BASEBAND) part 81, and main memory (MEM) 82. In the application component, at a microprocessor (PROCESSOR) 70 with built-in CPU 1 having a bytecode accelerator 10, an application processor and a baseband processor are connected via an interface (I/F) 73 and a camera (CMR) 75, a memory card (CARD) 76, a sound IC (SOD) 77, and a keyboard (KEY) 78 are connected via a peripheral interface (PERIPHERAL) 74, and an LCD (LCD) 79 and main memory (MEM) 80 are connected via an external bus. The system configuration shown here is for cell phones and wide variety of configurations can be applied to other portable devices such as mobile computers and digital cameras.

In this system configuration, memory is used, for example, as described below. The Java application is distributed from an external server via the antenna 83 and stored in main memory 82 via the baseband processor 81. Soft VM may be stored in either main memory 80 or 82. Preferably, the interpreter part of soft VM with a higher access frequency is stored in internal memory. This invention achieves faster bytecode processing, improving the added-value of the mobile information systems.

The invention disclosed in the present application has been described giving an example of the Java bytecodes but not limited to it, various modifications may be acceptable within the scope of the present invention. This means that the invention disclosed in the present application can be generally applicable the information processing devices, which translate an instruction code system into another system suing a hardware accelerator for execution.

The effects of the devices according to the embodiment of the present invention are summarized below. By including the bytecode accelerator, the Java bytecodes can be executed faster, however, a large amount of overhead incurred in the switching operation between the hardware and software processes must be reduced. To address this problem, the branch instruction for switching between the processing modes is executed in parallel with the transfer operation of internal information of the bytecode accelerator in the present invention, achieving higher processing speed than that of the conventional system, in which the branch instruction is executed after internal information of the bytecode accelerator is transferred (referred to as sequential processing). Switching between processing modes is performed in the activate process for the bytecode accelerator, the end process when an unsupported bytecode is detected or a Java exception occurs, and the end process when a CPU exception/interrupt occurs at a higher accuracy, largely contributing to speed-up of bytecode execution.

According to the present application, switching between hardware processing and software processing of the program in the intermediate language can be performed at a higher speed.

What is claimed is:

1. An information processing device comprising:
a plurality of registers;
an instruction execution part for executing first format instructions as corresponding instructions;
an instruction translator logic;
a first operation mode, in which a first group of instructions included in a first program are translated into the first format instructions and then executed by the instruction translator logic when the first program written in a second format is executed; and
a second operation mode, in which a second group of instructions in the first program is translated and executed by translation software described by the first format instructions,
wherein when the operation mode is switched between the first and second operation modes, switching between the operation modes is performed in parallel with the data transfer operation between at least one of the plurality of registers and the instruction translator logic.

2. An information processing device according to claim 1, further comprising a program counter including the address of an instruction to be executed by the instruction execution part,
wherein the information processing device, when receiving an instruction for switching from the first mode to the second mode, executes a first instruction for setting the address of an instruction to be translated into the first format instruction in the first group of instructions in the program counter, a second instruction for extracting a value in the program counter of the instruction for switching from the first mode to the second mode, in one of the plurality of registers, and a third instruction for setting stack information included in another one of the plurality of registers in the instruction translator logic.

3. An information processing device according to claim 2, wherein the first instruction is a branch instruction and the instruction execution part executes the second and third instructions in parallel with the branch instruction using a branch-delay slot in the first instruction.

4. An information processing device according to claim 2, wherein the instruction translator logic, when receiving the instruction for switching from the first mode to the second mode, goes to the active state from the idle state.

5. An information processing device according to claim 1, further comprising a program counter for including the address of an instruction to be executed by the instruction execution part,
   wherein the information processing device, when receiving an instruction for switching from the second mode to the first mode, executes a fourth instruction for setting the address of the translation software to be executed in the program counter, a fifth instruction for setting the address of the instruction for switching from the first mode to the second mode in one of the plurality of registers, and a sixth instruction for extracting stack information included in the instruction translator logic in another one of the plurality of registers.

6. An information processing device according to claim 5, wherein the fourth instruction is a branch instruction and the instruction execution part executes the fifth and sixth instructions in parallel with the branch instruction using a branch-delay slot in the fourth instruction.

7. An information processing device according to claim 5, wherein the instruction translator logic, when receiving the instruction for switching from the second mode to the first mode, goes to the active state to the idle state, in which the logic stops instruction translation.

8. An information processing device according to claim 1, further comprising data transfer paths for transferring data between the instruction translator logic and at least one of the plurality of registers.

9. An information processing device according to claim 1, wherein the instruction translator logic translates an instruction, if it is in the first group of instructions, into the first format instruction using a translation table part.

10. An information processing device comprising:
    an instruction input part for receiving the first or second format instructions;
    a register file including a plurality of registers;
    an instruction execution part for executing the first format instructions as their corresponding instructions using the register file;
    an instruction translator logic for translating the second format instruction into the first format instructions, when the instruction input part receives them, and supplying the translated instructions to the instruction execution part;
    data transfer paths for transferring data between the instruction translator logic and the register file,
    wherein the instruction translator logic translates an instruction in the first group of instructions into the first format instruction and supplies it to the instruction execution part when the instruction input part receives the instruction in a first group of instructions out of the second format instructions; and
    translation software described by the first format instructions translates an instruction in the second group of instructions into the first format instruction and supplies it to the instruction execution part,
    wherein the instruction execution part has a pipeline structure and executes a plurality of instructions for activating the instruction translator logic using the branch-delay slot.

11. A mobile information system comprising:
    an antenna;
    a first information processing device for coding signals received from the antenna;
    a first main memory connected to the first information processing device;
    a second information processing device having plural registers, an instruction execution part for performing first format instructions using the registers, and an instruction translator logic, which can access the first main memory; and
    a second main memory connected to the second information processing device,
    the information processing device providing a first operation mode, in which the instruction translator logic translates a first group of instructions in second format instructions into the first format instructions when a program written in the second format, which is transferred to the first main memory via the antenna is executed and
    a second operation mode, in which the translation software described by the second format instructions translates a second group of instructions out of the second format instructions into the first format instructions for execution,
    wherein when the operation mode is switched between the first and second operation modes, switching between the operation modes is performed in parallel with the data transfer operation between the plurality of registers and the instruction translator logic.

12. A mobile information system according to claim 11, wherein the translation software is stored in the second main memory.

* * * * *